United States Patent

[11] 3,543,927

[72] Inventors Jesse Randolph Pinkham;
Leslie Elmer Payne; David Hill Michal;
Colin Shaw McArthur, Winston-Salem,
North Carolina
[21] Appl. No. 781,113
[22] Filed Dec. 4, 1968
[45] Patented Dec. 1, 1970
[73] Assignee R. J. Reynolds Tobacco Company
Winston-Salem, North Carolina
a corporation of New Jersey

[54] APPARATUS FOR TESTING CIGARETTES
25 Claims, 17 Drawing Figs.
[52] U.S. Cl. .................................................. 209/75,
73/45.1, 73/95
[51] Int. Cl. ...................................................... B07c 3/10
[50] Field of Search ........................................... 209/75;
73/45.1, 45.2, 95

[56] References Cited
UNITED STATES PATENTS
3,377,843 4/1968 Rudszinat .................... 73/45.2
3,456,787 7/1969 Pinkham ...................... 73/95X Primary Examiner—Richard A. Schacher
Attorneys—Robert S. Dunham, P. E. Henninger, Lester W. Clark, Gerald W. Griffin, R. Bradlee Boal, Thomas F. Moran, Howard J. Churchill, Christopher C. Dunham and Thomas P. Dowd ABSTRACT: An apparatus and method for inspecting filter-tipped cigarettes either singly or in groups, comprising the application of pull, leak, and loose end tests while maintaining a high speed line. A rotating inspection drum has cigarette-holding members on its surface, certain or all of which are provided with means for performing a pull test i.e., testing the cigarette in tension to check the soundness of the connection between the filter and the tobacco rod, and means for administering a leak test shortly thereafter. In the pull testing operation, the cigarette-holding members cooperate with grippers on a separate drum in applying a tensile stress on the cigarettes at opposite sides of the tip joints, rather than at the ends, and leak test couplings are provided on the inspection drum which subsequently couples the cigarette ends to a source of air at a pressure different from the ambient pressure, to test for leaks and separated joints. By using various feed drum and test drum combinations for testing alternate cigarettes in the line, the cigarettes are tested individually rather than in double units while the high speed of the line is maintained.

JESSE R. PINKHAM
LESLIE E. PAYNE
DAVID H. MICHAL
COLIN S. McARTHUR
INVENTORS

BY Lester W. Clark

ATTORNEY

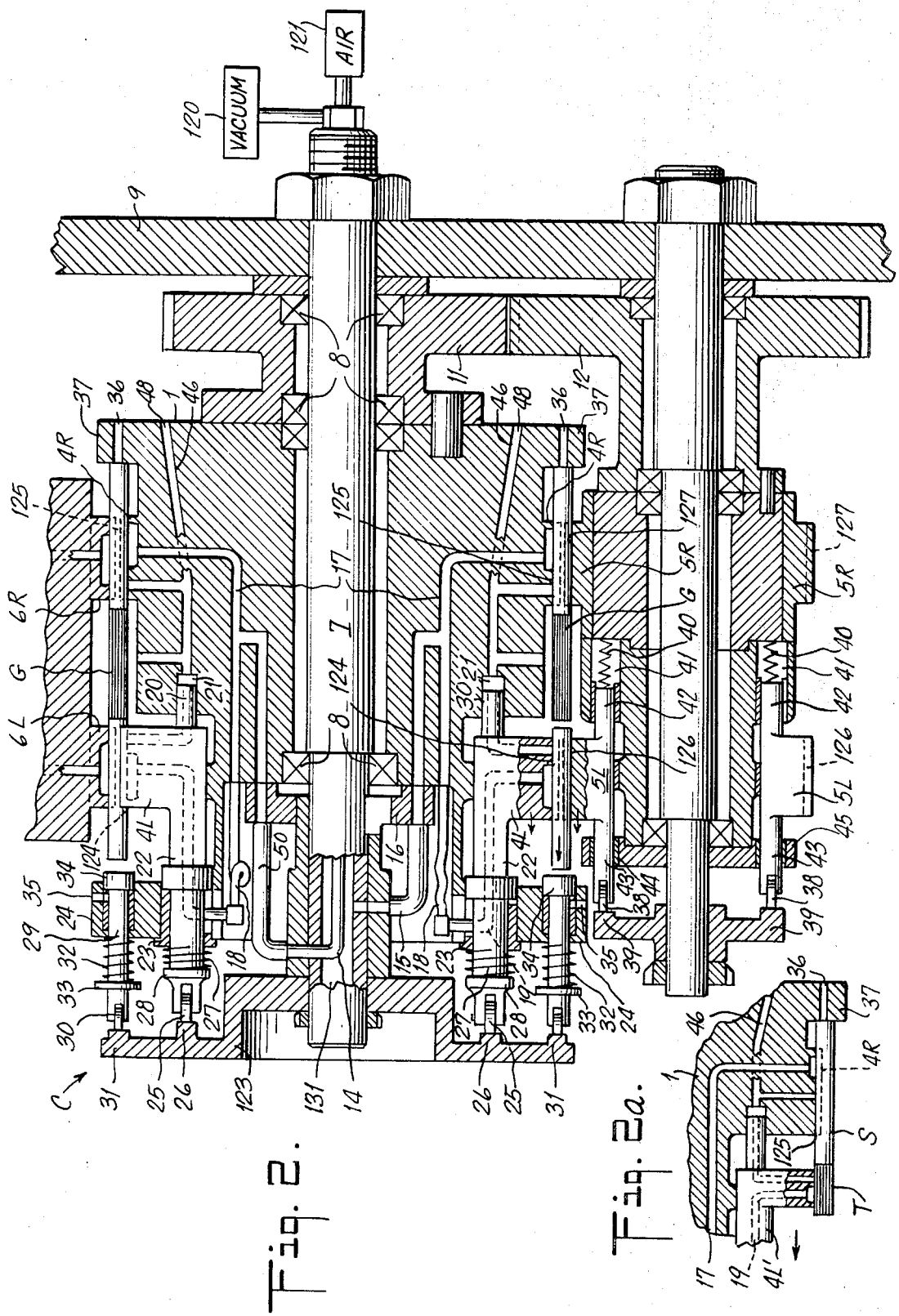

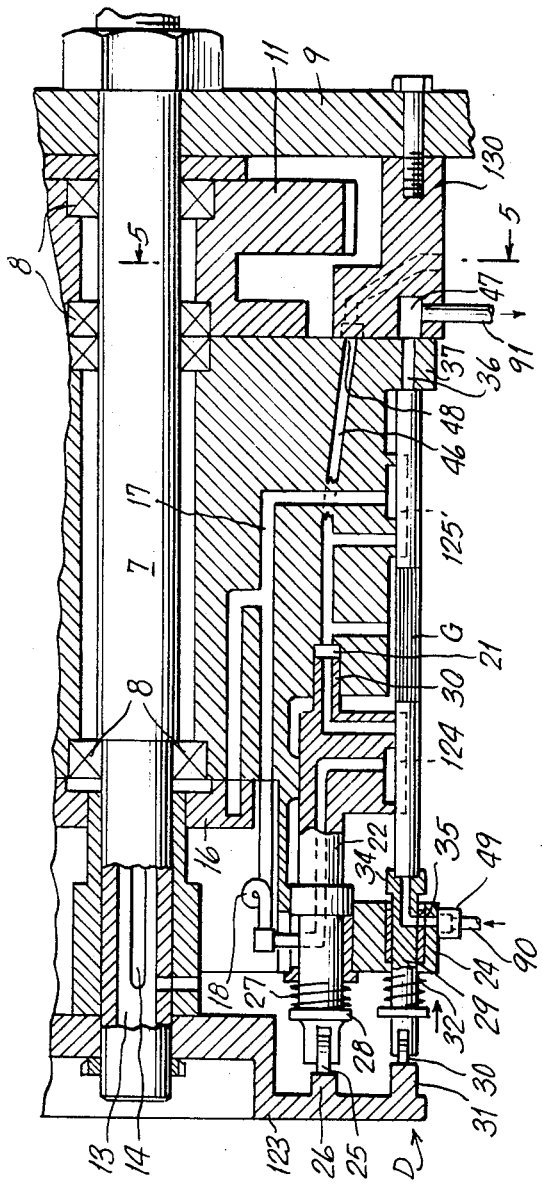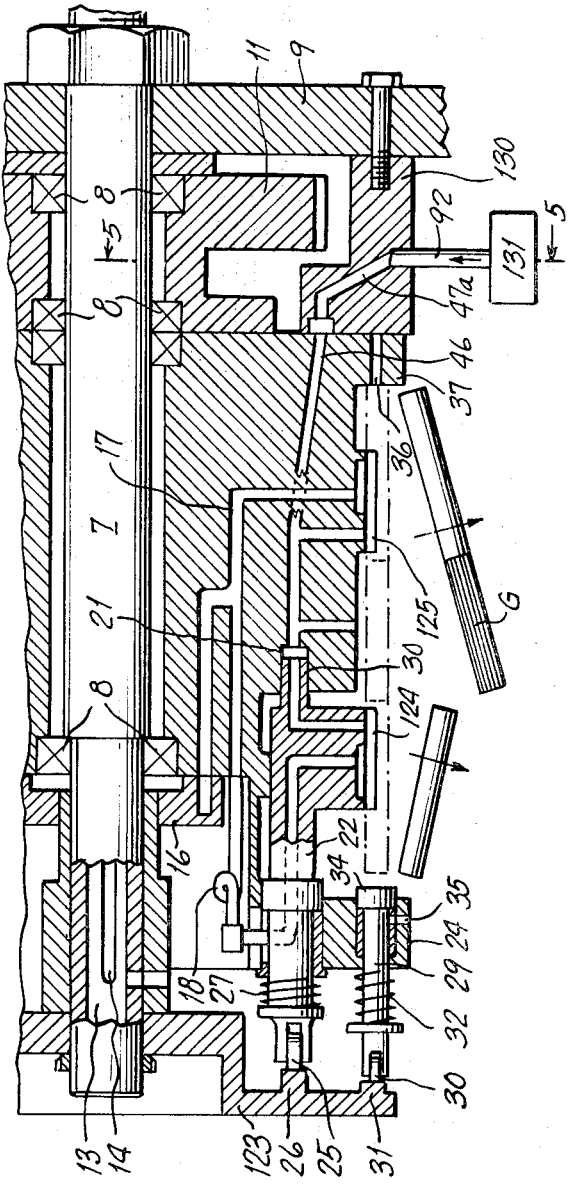

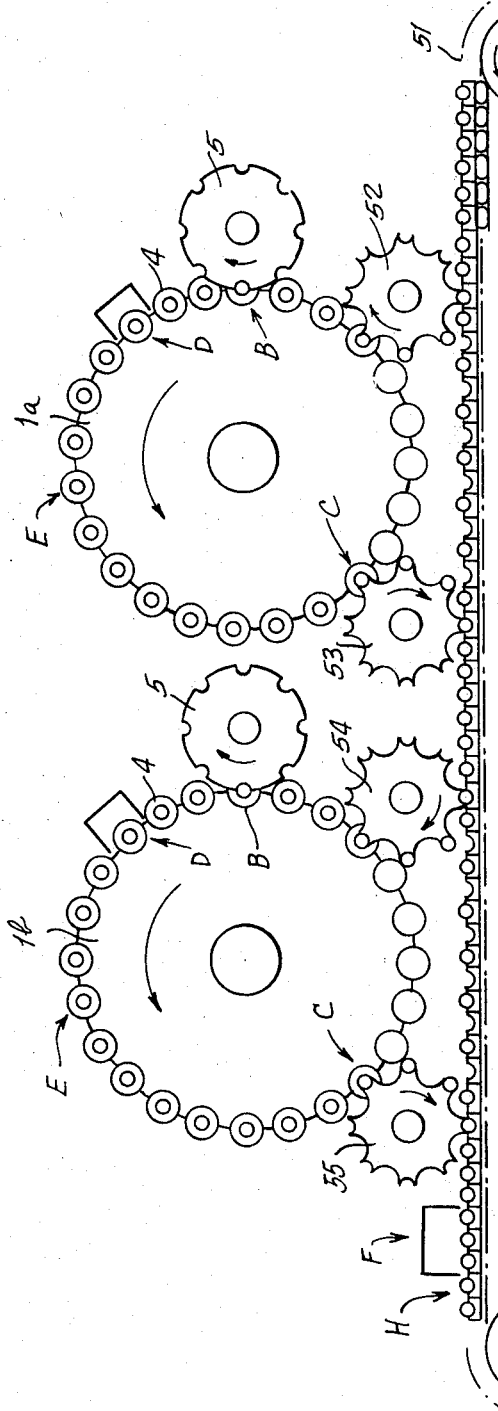
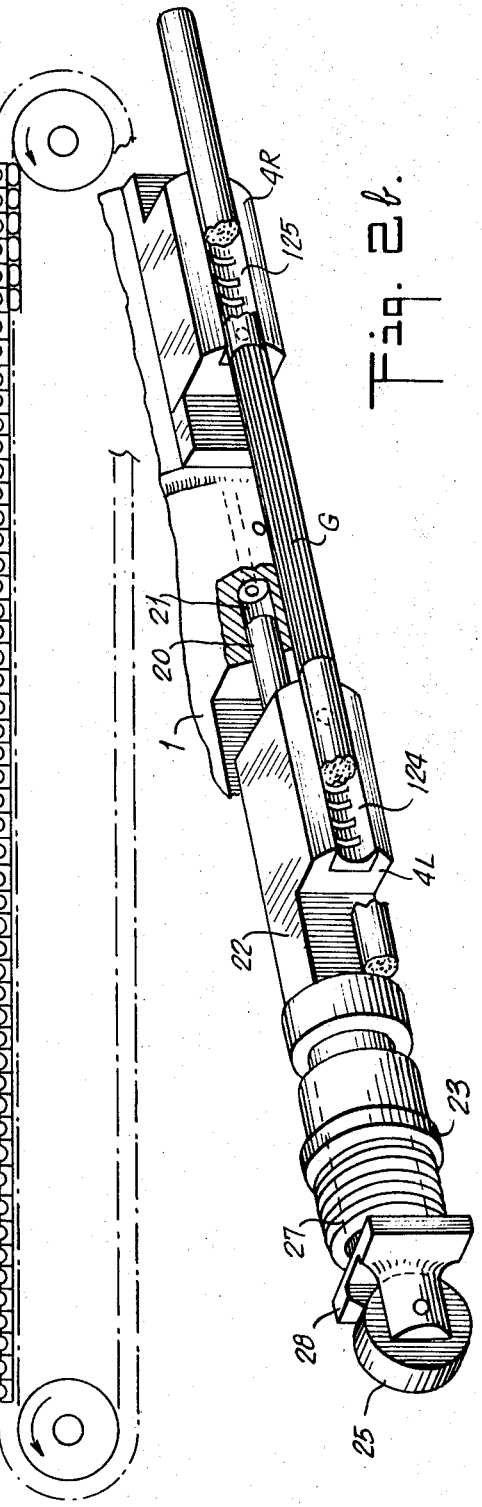

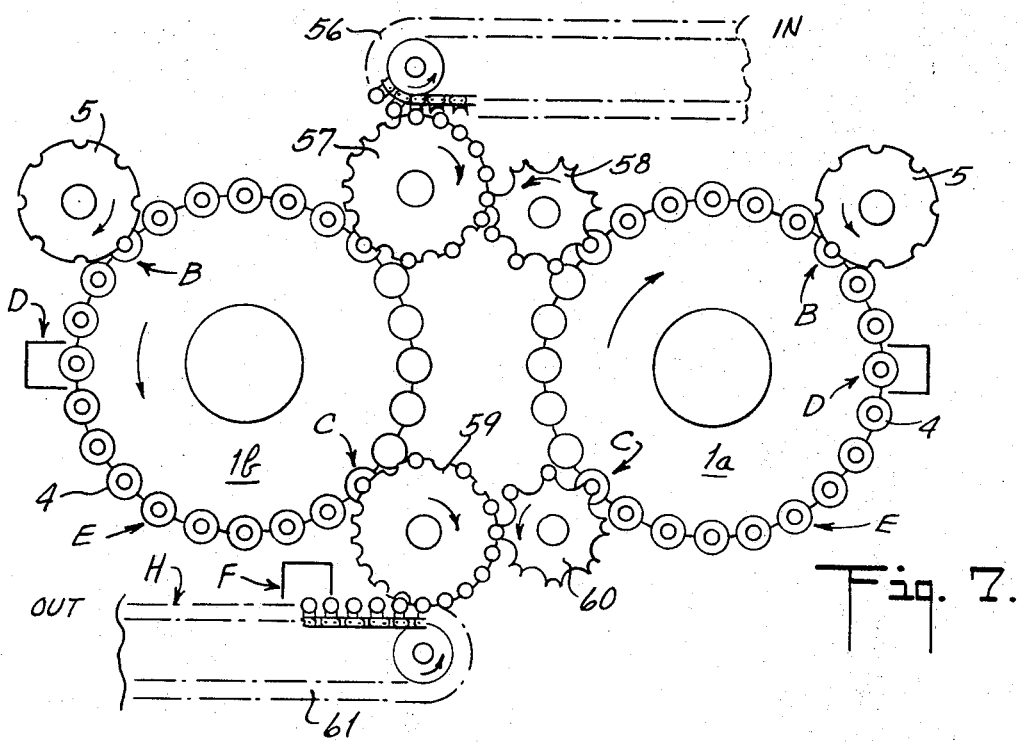
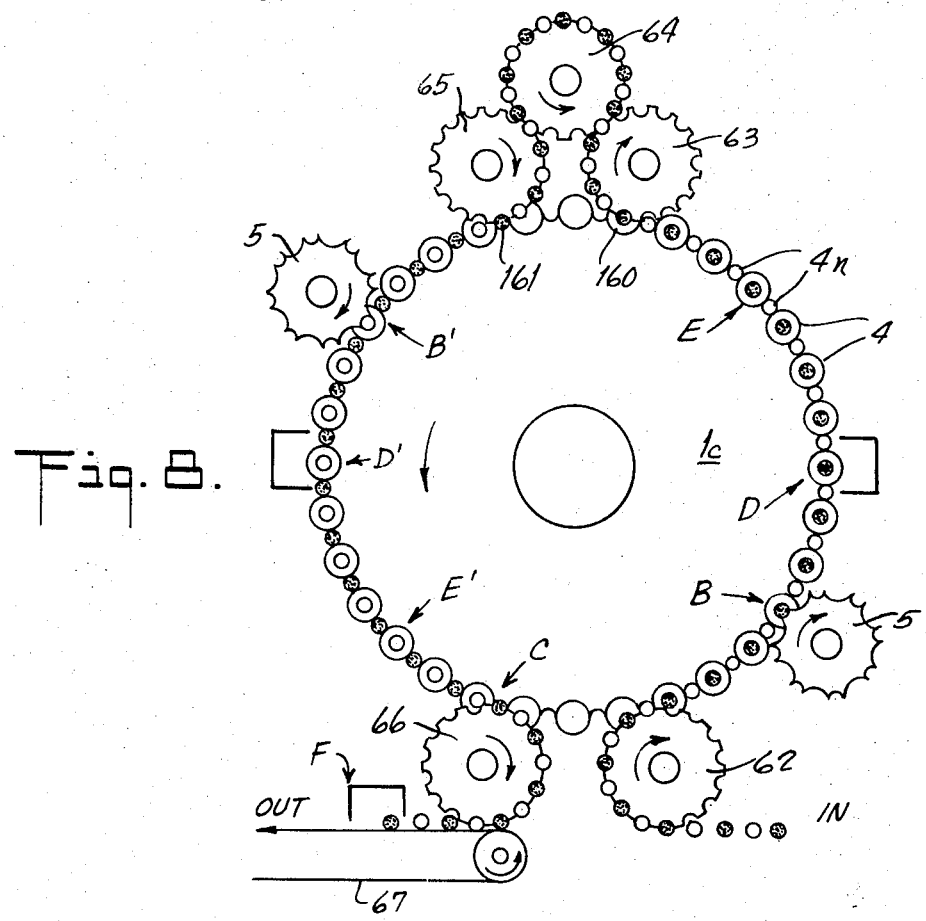

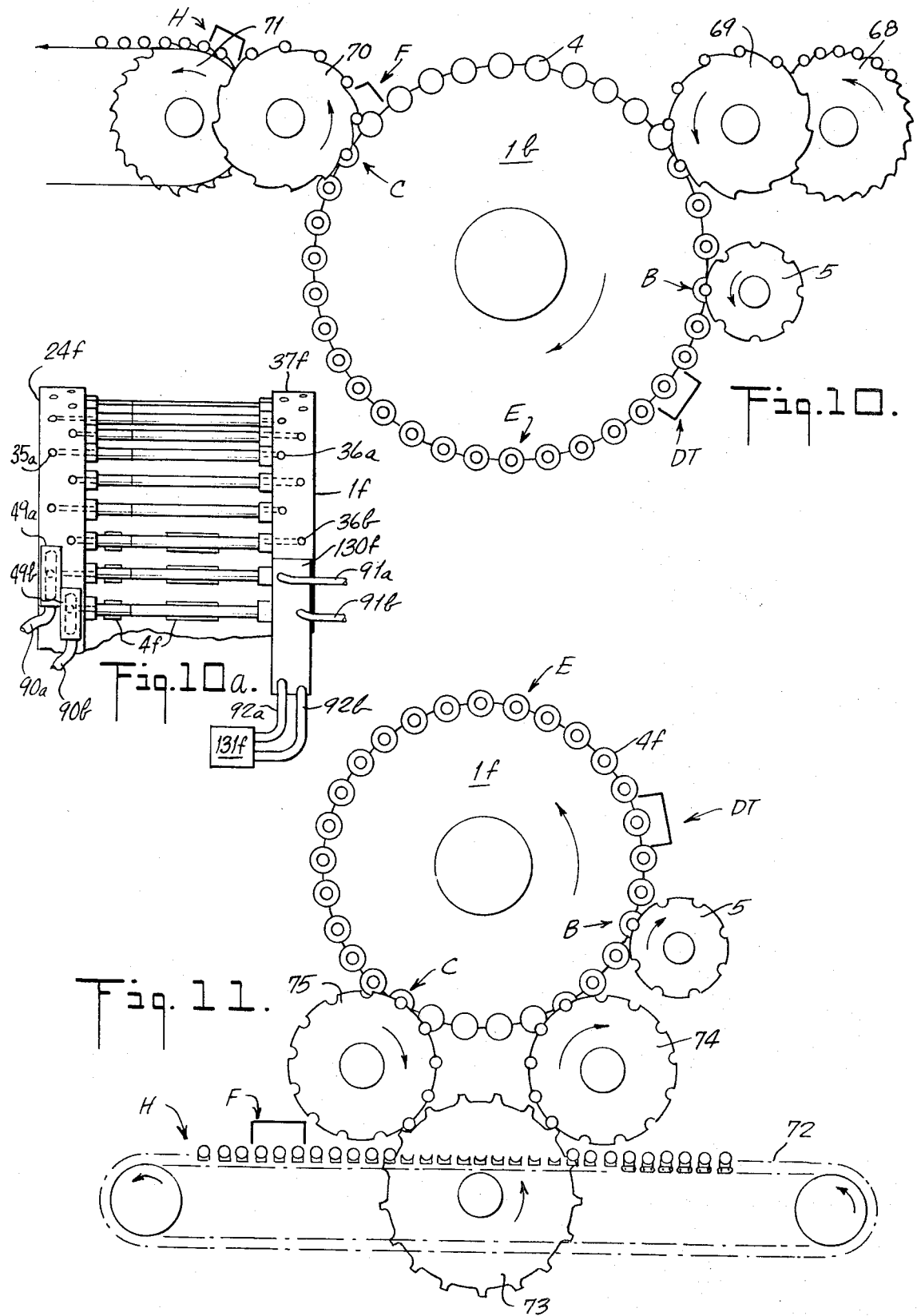

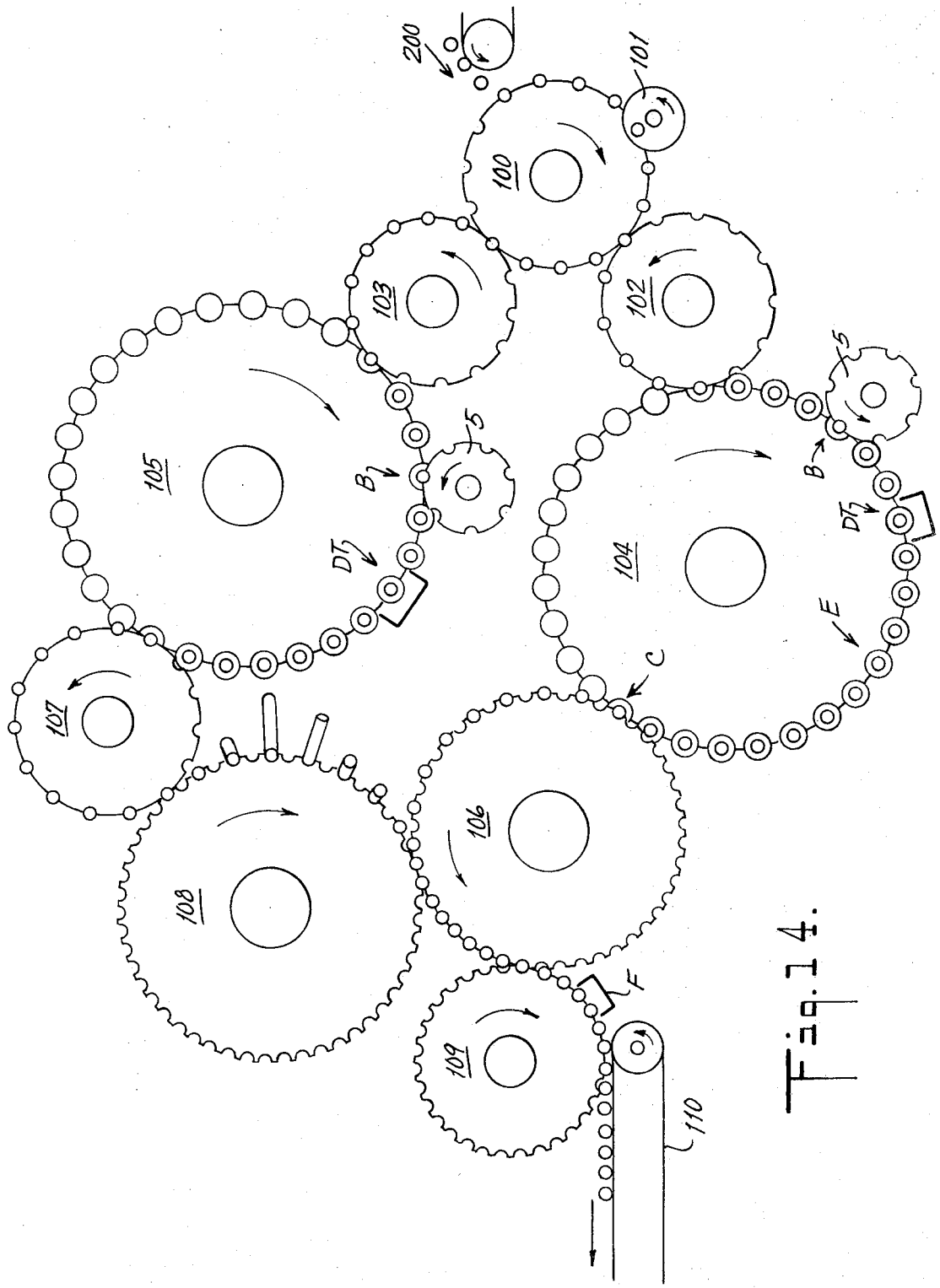

3,543,927

APPARATUS FOR TESTING CIGARETTES

BACKGROUND OF THE INVENTION

The present invention relates to inspection apparatus to be used in connection with the manufacture of smoking articles and more particularly, to an improved method and means for performing pull, leak, and loose end tests on tipped cigarettes in a high speed manufacturing line.

In the past, various machinery has been provided for inspecting manufactured cigarettes for defective construction such as leaks or imperfections in their paper covers or loosely packed ends. A particular test performed by this machinery is known in the industry as a "leak test", and generally comprises subjecting the inside of a cigarette to a pressure different from the ambient pressure, and measuring the pressure difference. Deviation of the pressure of the air in the cigarette from a normal value is used to indicate a leak somewhere along its length. Cigarettes having such leaks are rejected from the manufacturing line. Suitable apparatus for performing this test is described in U.S. Pat. No. 2,951,364 issued to J. H. Sherrill and assigned to the assignee of the present application.

With filter-tipped cigarettes, such testing is particularly necessary to detect faulty sealing at a joint between the filter and tobacco rod. It has been found that it is not only necessary to give filter-tipped cigarettes a leak test, but it is also necessary to physically pull the cigarettes axially to insure inspection against a poorly glued joint between the rod and filter. The tipping material that is wrapped about the tobacco rod and filter only overlaps the soft rod for about 4 millimeters. In the event there is a deficiency of glue on the overlapping margin of the tipping material, it is possible to have a tight wrap about the joint that is sufficiently air tight to pass the leak inspection, but which is not adequately glued. The porosity of the cigarette paper prevents the use of a leak test having a sensitivity sufficient to detect slight leaks, and in conducting such leak tests, the ends of the cigarette are frequently pressed toward each other, tightening the joints and making the detection of faulty joints more difficult. A pulling test has thus been devised to detect such faulty joints. Apparatus for carrying out such a test is disclosed in the copending patent application of Jesse R. Pinkham et al., U.S. Pat. application Ser. No. 613,244, filed Feb. 1, 1967, now U.S. Pat. No. 3,456,787 and assigned to the assignee of the present application.

In that pull test, the means used for coupling the ends of the cigarette to an air supply for the leak test were adapted to grip the cigarettes near the ends and apply a tensile force on the cigarette at or just prior to performance of the leak test. Faulty or parted joints would thus be separated and immediately detected by the leak test so that these defective cigarettes would be rejected along with those found to have other leaks. However, it has been found that the softness of the freshly made cigarettes tends to prevent sufficient grip near the ends to provide enough tensile stress to separate assemblies that are partially glued together.

These tests have been generally performed on filter-tipped cigarettes at a stage in their manufacture where they existed as double units, that is, units including two tobacco rod sections joined together by a double length filter. Such units are subsequently severed at the center into two cigarettes. When testing the double units, the cigarette end gripping means necessarily must engage two soft tobacco rods to perform the pulling operation. If the grip is not effective, a defective unit may pass the pull test. Also, such double unit tests are wasteful in that many double units are rejected when only one of the two filter-to-rod joints is defective.

A further test is generally run to detect loosely packed ends. This test comprises the projecting of mechanical or pneumatic probe against the tobacco at the end of the cigarette and sensing the reaction to determine if the ends are firmly constructed. Means for performing this test are disclosed in the copending application of C. S. McArthur, U.S. Pat. application Ser. No. 682,340, filed Nov. 13, 1967, now U.S. Pat. No. 3,483,970, and assigned to the assignee of the present invention.

SUMMARY OF THE INVENTION

The present invention embodies an apparatus and method which permits the performance of satisfactory pull, leak and loose end tests on single or even double unit cigarettes, without requiring a decrease in the speed of production. The invention is accomplished by conveying and testing means preferably in the form of a test drum, in improved combinations with various feed and pickoff drums.

The improved pull testing means is provided with cigarette-holding members on its surface which are adapted to cooperate with an auxiliary gripper drum to grip the cigarettes along a substantial length thereof when applying a tensile force thereto. The conveyor means is also provided with means adjacent each cigarette-holding member for performing leak tests on the cigarettes after they have been subjected to the pull test. The conveyor means of the present invention may be further provided with an improved leak inspection arrangement wherein the cigarette in each holding member is tested over twice the pitch or spacing of the members. This permits the allocation of a single cigarette to a holding member since the drum speed can be doubled in comparison to the speed used in the past when testing a double unit over a single pitch.

Also, by utilizing various methods for testing alternate cigarettes in the line, high speed production may be maintained while conducting the improved pull and leak tests.

BRIEF DESCRIPTION OF THE DRAWINGS

FIG. 2 is a sectional view, taken along the line 2-2 of FIG. 1, showing the structural detail and cooperation of the improved test drum, auxiliary pull test drum, and the takeoff drum;

FIG. 2a is a fragmentary view as in FIG. 2 showing an alternate construction adapted to test single cigarettes;

FIG. 2b is a detailed view of the cigarette holding members on the test drum of FIG. 2;

FIG. 3 is a sectional view, taken along the line 3-3 of FIG. 1, showing the test drum at the leak test station;

FIG. 4 is a sectional view, taken along the line 4-4 in FIG. 1, showing the test drum at the reject station;

FIG. 6 is a diagrammatic view of apparatus for inspecting cigarettes in a high speed testing line, embodying certain features of the present invention;

FIG. 7 is a diagrammatic view of an alternate arrangement of high speed testing apparatus;

FIG. 8 is a diagrammatic view showing another alternate arrangement of a high speed testing line;

FIG. 10 is a diagrammatic view showing a modification of the present invention, including a twin leak inspection apparatus;

FIG. 10a is a fragmentary elevational view of a portion of the twin leak inspection apparatus of FIG. 10;

FIG. 11 is a diagrammatic view showing a modified test drum of the type shown in FIG. 10, in cooperation with a system of transfer drums, in an alternate arrangement;

FIG. 14 is a diagrammatic view of another testing apparatus embodying certain features of the invention, including double unit cigarette cutting means and a turnover drum.

DETAILED DESCRIPTION

The improved cigarette inspection means will first be described in connection with the performance of the pull and leak tests on either double unit or single filter cigarettes and then with regard to the various modifications and combinations for testing single cigarettes at the same production rate as previously achieved with double unit cigarette testing apparatus. While the embodiment illustrated employs rotating drums, it will be understood that other equivalent conveying means may be used which are well known to those skilled in the art.

Figure 1:
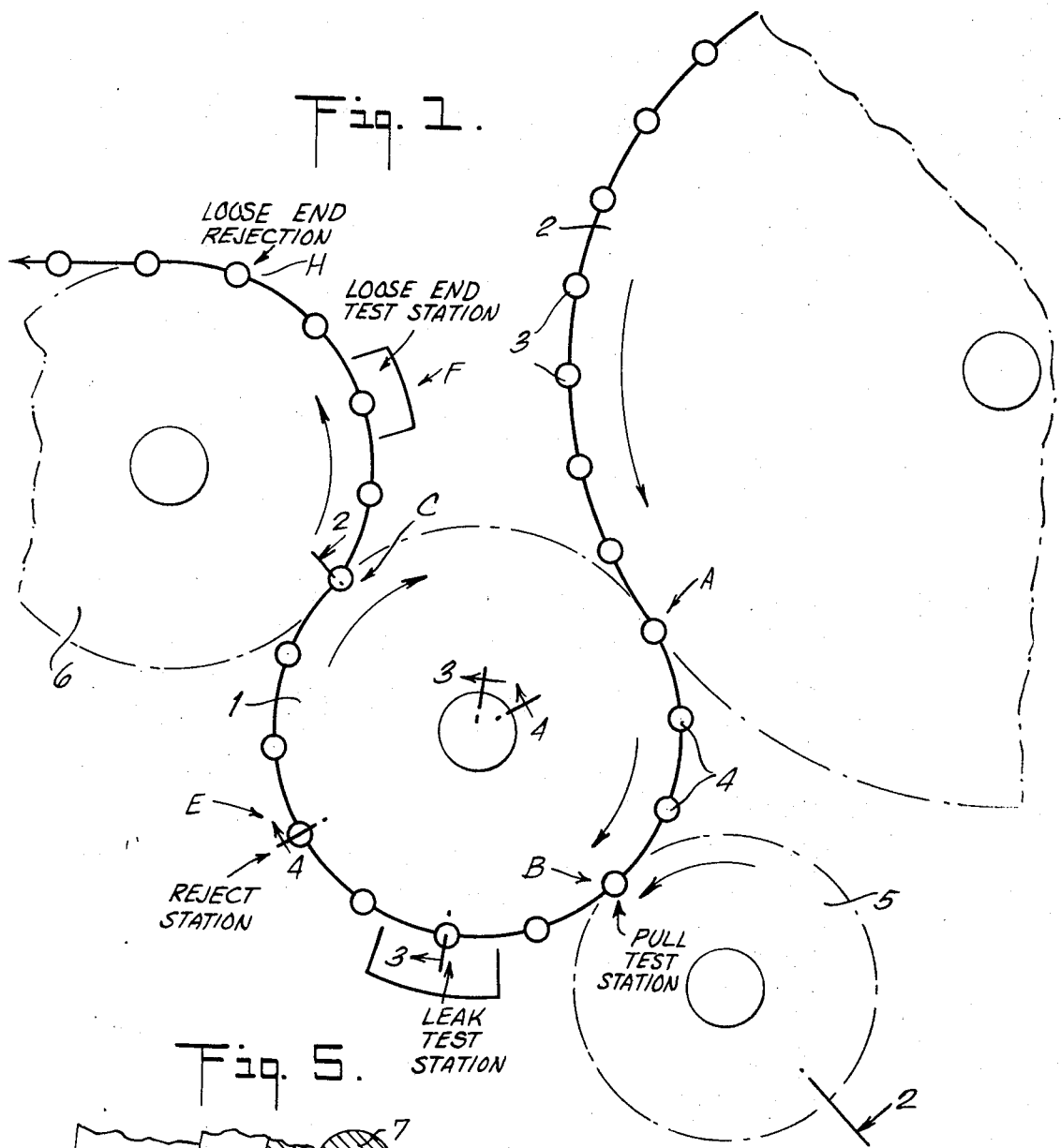
FIG. 1 is a diagrammatic view of a pull testing drum, showing its cooperation with a cigarette feed drum, an auxiliary pull test drum, and a takeoff drum.

FIG. 1 shows a test drum 1 located in a high speed cigarette manufacturing line, in cooperation with its adjacent drums. The operation of this drum 1 will be described in connection with the testing of filter-tipped cigarettes, but it will be understood from the following description that it is readily adaptable for the testing of any smoking article constructed of tobacco, with or without a tipped end, as well as with articles other than those designed for smoking, but of similar construction.

A large feed drum 2 is shown at the upper right-hand corner of FIG. 1, rotating in a counterclockwise direction, and provided with suitable cigarette holding members or flutes 3 on its peripheral surface, adapted for holding and transporting cigarettes along the processing line. This large drum 2 transfers the transported cigarettes to flutes 4 on the test drum 1 adjacent the point of tangency A. The mechanism for transferring the cigarettes from one drum to another is conventional, except as it may be more fully described in the following description of the structural details of the test drum.

The cigarettes, now held in the flutes 4 of the test drum 1 move in a clockwise direction to the pull test station at the point of tangency B of the test drum 1 with the auxiliary gripper drum 5. After the performance of the pull test, each cigarette passes to the leak test station D further along the path of rotation of the test drum 1, and then to the reject station E. Cigarettes which have been found to be defective as a result of the pull and leak tests, will be ejected from their holding flutes at the reject station E, and the good cigarettes are then passed to the point of tangency C between the test drum 1 and the takeoff drum 6. At this latter point C, the cigarettes are transferred to the takeoff drum 6 and are passed in a counterclockwise direction by it, to a loose end inspection station F, if desired, and then onward to the left for further processing along the line.

The details of construction of the inspection or testing drum 1 are shown in FIG. 2. The test drum 1 is mounted for rotation on a stationary shaft 7, by means of suitable bearings 8. The shaft 7, in turn, may be mounted on a common support structure, such as a wall 9, along with a mounting shaft 10 for the auxiliary gripper drum 5 and that of the takeoff drum 6 (not shown). The testing drum 1 and the gripper drum 5 are constrained to rotate together in opposite directions by cooperating drive gears 11 and 12. The takeoff drum 6 may be provided with a similarly acting gear which is not shown. A source of vacuum 120 communicates with an axial bore 13 in the support shaft 7, and a supply of air 121 under superatmospheric pressure is similarly conducted to the drum through a line 14 passing through the axial bore 13.

The cigarettes which are transferred to the drum 1 are held in a series of suitable fluted members 4L and 4R provided on the peripheral surface of the drum. The cigarettes are held in these fluted members by means of the vacuum which is communicated to them through a line 15, a bore through fixed annular manifold 16, and passages 17 formed in the drum 1. The left-hand fluted members 4L are mounted for movement parallel to the axis of the drum 1. A flexible line 18 is provided for connecting a conduit 19 in the fluted member 4L with the internal conduit 17 in the drum 1, so as to accommodate that movement.

The particular cigarettes G shown in FIG. 2 are located at the pull test and takeoff stations and are of the dual unit form, as previously described. However, as shown in FIG. 2a, the improved drum may be readily used with single, filter-tipped cigarettes having the movable fluted member 4L' holding the filter-tip portion T. The construction of the fluted members 4L and 4R is shown in detail in FIG. 2b which may be referred to in conjunction with FIG. 2 for a better understanding of the following description.

With particular regard to the movable fluted members 4L, they are each seen to be provided at one end with a stub shaft 20 which operates within a suitable bore 21 in the drum 1, to constrain them to longitudinal reciprocating motion. The arms or extensions 22 on the opposite ends of members 4L are constrained to move in bushings 23 provided in openings through an annular end flange 24 on the drum 1. Roller cam followers 25 are located on the tips of the extensions 22, and cooperate with an annular cam 26 on the member 123 fixed on the drum support shaft 7. Compression springs 27 encircle the extensions 22 and act between the bushings 23 and flanges 28 on the extensions 22 to urge the fluted members 4L to the left. This capability of the fluted members 4L to move longitudinally is utilized in performing the pull test.

The means for performing the leak test is located on the annular flange 24 radially outwardly of the fluted member moving structure. It comprises rods 29 located in other flange openings, and provided with roller cam followers 30 which cooperate with another annular cam 31 concentric with cam 26 on the member 123 fixed to the support shaft 7. The rods 29 are similarly urged to the left by compression springs 32 acting between the drum flange 24 and collars 33 located thereon. The right-hand end of each shaft 29 is provided with a hollow cigarette end coupling member 34. A series of small bores 35 is provided in the drum flange 24 and communicates with the coupling members 34. A series of similar bores 36 is provided in a flange 37 on the right-hand end of the drum 1 to communicate with the opposite ends of the cigarettes, as will be more fully described hereinafter.

The auxiliary gripper drum 5 is provided with fixed fluted members 5R and movable fluted members 5L. The flutes 126 and 127 in these members are also less than semiannular curved recesses. Drum 5 may be of a smaller diameter than the test drum 1, for space convenience. The movable fluted members 5L are similarly provided with roller cam followers 38 which cooperate with an annular cam 39 fixed to the support shaft 10. Compression springs 40, urging the fluted members 5L against the cam surface 39, may be located in guide channels 41 within the drum 5. The springs 40 act against the faces of right-hand extensions 42 on the fluted members 5L, while left-hand extensions 43 ride in bushings 44 in an annular end flange 45 on the drum 5.

Finally, the drum 1 is provided with passages 46 for use in connection with the reject operation which will be described hereinafter.

THE PULL TEST

The pull test is best described with reference to FIG. 2. The cigarettes G in dual unit form which have been supplied to the test drum 1 from the feed drum 2, as shown in FIG. 1, are held in the fluted members 4L and 4R by means of the vacuum communicated through the bore 13 in the support shaft 7, line 15, manifold 16, and passages 17, as previously described. The cigarettes G are held on opposite sides of the filter tip-to-rod joint in flutes 124 and 125 which are rounded, but less than semiannular, recesses in the fluted members 4L and 4R. The vacuum is communicated to the interior of the flutes 124 and 125 holding the cigarettes therein. As the drum 1 rotates, the source of vacuum is communicated to the passages 17 through the fixed manifold 16 just before the point of tangency A with the feed drum 2. At this point, a similarly acting vacuum in the fluted members 3 of the feed drum 2 is released, so that the test drum fluted members 4 transfer the cigarettes G into their own flutes. The cigarettes held in this manner in the flutes are passed to the pull test station B.

At the pull test station B, the fluted members 5L and 5R on the rotating auxiliary gripper drum 5, come into contact with the exposed side of the cigarettes, and cooperate with the fluted members 4L and 4R respectively, on the test drum 1 to grip the cigarettes between them. At this point B, the respective cam surfaces 26 and 39 which cooperate with the movable fluted members 4L and 5L on the respective drums, both drop away, permitting a force resulting from the action of their respective compression springs 27 and 40 to act on the fluted members tending to move them to the left. This action will impress a pulling force on the gripped cigarette to test the strength of the filter tip-to-tobacco rod joint or joints located between the sets of gripping fluted members.

In order to have the cooperating fluted members 4L, 5L and 4R, 5R sufficiently grip the cigarettes to impress the pulling force without exerting an excessive compressional force which will crush or deform the cigarettes, the axes of the respective drums 1 and 5 must be properly spaced. This spacing is a function of the compressed cigarette diameter and the distances between the axes of the drums and the bottoms of their respective flutes. In setting up the arrangement, first, the acceptable diameter of the cigarette is determined. This will be the distance between the cooperating flute bottoms in compression when the cigarette is sufficiently compressed by the fluted members to obtain an adequate grip for impressing the pulling force, but not compressed to the point of permanently deforming the cigarette. The proper distance between the drum axes may then be computed by adding this diameter to the sum of the distances between the respective drum axes and the bottoms of their respective flutes.

As previously mentioned and as partly shown in FIG. 2b, the flutes 124, 125 and 126, 127 are less than semiannular rounded recesses. The curvature of the recesses is substantially the same as the curvature of the surface of the cigarette. Thus, when the cooperating fluted members 4L, 5L and 4R, 5R grip the cigarettes between them, their sides will not contact each other so as to leave some tolerance to avoid interaction between the two drums 1 and 5.

The maximum amount of tension to be applied must, of course, be below the amount which would result in damage to a cigarette having a reasonably good joint. Experience has shown that a practical upper limit of the tension applied to good cigarettes is about 40 ounces. At high cigarette production rates, the bonding of the joint may not reach full strength in the time between formation of the joint and testing, e.g., because of insufficient curing time for the glue, in which case, the maximum tension applied may be lowered to about 5 to 24 ounces. This lower maximum value of testing tension is usually sufficient to part unglued or poorly glued joints, but will not normally part properly formed joints even though maximum strength is not yet attained. The particular testing tension to be employed in testing a particular type of joint will depend on the characteristics of the joint itself, of the glue or other adhesive, and of the types of papers being used. It is apparent that a quick curing adhesive is desirable, so that there need not be an unduly long distance in the manufacturing line between the point where the cigarettes are made and the point where the testing of the joints by the method of this invention takes place.

As indicated in FIG. 2, a poorly glued or parted joint 128 will become separated. When the cigarettes proceed beyond the pull test station B, the gripping action of the fluted members 5L and 5R on the auxiliary drum 5 will be released, and the tested cigarette is continuously held in the fluted members 4L and 4R on the test drum 1 and passed to the leak test station D. The movable fluted member 4L will be returned, by cam action, to its initial pickup position if it has been displaced.

THE LEAK TEST

The operation of the leak test will be best understood by reference to FIG. 3. As the test drum 1, in its rotation, reaches the leak test station D, the size of the cam 31 on the fixed member 123 will increase, urging the rod 29 to the right, against the action of the compression spring 32. The opposite end 34 of the rod 29 will engage the end of the cigarette, and surround it in sealing relationship about its surface. The pushing action of the rod 29 on the one end will place the opposite end of the cigarette in abutment with the drum flange 37 and in communication with the bore 36. The opposite ends of the cigarette are thus coupled and substantially sealed about the surface preparatory to the performance of the leak test.

At the point of the leak test station, a manifold member 130 (FIG. 5) is mounted on the support wall 9 and has passages 47 and 47a therein which are arranged to communicate with the bore 36 in the flange 37, as well as with the rejection passage port 48, when a further point is reached in the line. An air supplying sliding shoe 49 is located on the opposite side of the drum 1 from the manifold 130 and communicates with the bore 35 in the annular flange 24, at the same time that the manifold passage 47 communicates with the bore 36 in the opposite flange 37. Compressed air from pipes 90 and 91 may then be blown into the cigarette through both ends or in the left-hand end and out the right-hand end, in performing the leak test. Alternatively, air may be drawn through the cigarette by connecting a source of vacuum to one or both of the pipes 90 and 91. By monitoring the pressure occurring within the various cigarettes, those with separated joints or other leaks therein, may be detected.

It will be seen that if desired the pull and leak tests can be performed substantially simultaneously with slight modification of the structure.

THE REJECT STATION

Figure 5:
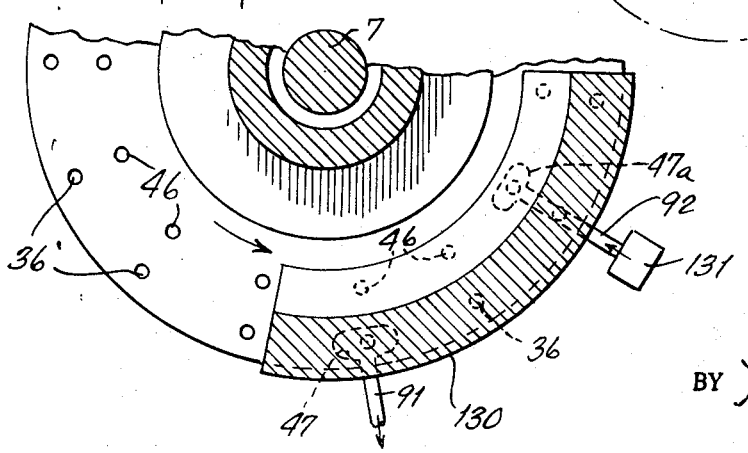
FIG. 5 is a sectional view, taken along the line 5-5 in FIG. 3, showing the air supply manifold of the test drum at the leak test and reject stations.

The rejection action will be explained with reference to FIG. 4. Upon completion of the leak test, the cigarettes continue along the arc of drum rotation, reaching a position where the annular cam surface 31 drops away, permitting the spring 32 to retract rod 29 releasing the end 34 of the rod 29 from engagement with the end of the cigarette. As seen in FIG. 5, communication between the air passage 47 in the manifold 130, and any given bore 36 in the flange 37 will cease as the rotation proceeds, the associated reject passage ports 48 in the drum 1 will subsequently come into communication with another passage 47a in the manifold 130. This other passage 47a is also in communication with a source of compressed air 131 through pipe 92. If the cigarette in a given flute is found to be defective, a signal is communicated to valve means (not shown) controlling the source of compressed air. Suitable valve means for this purpose is disclosed in the copending applications of Colin S. McArthur et al., U.S. Pat. application Ser. No. 551,162, filed May 18, 1966 now U.S. Pat. No. 3,426,582, and U.S. Pat. application Ser. No. 552,050, filed May 23, 1966 and now U.S. Pat. No. 3,426,583, and assigned to the assignee of the present invention.

The valve means causes compressed air to be sent through the conduit 46 in the drum 1 to the interior of the flutes 124 and 125 in the holding members 4L and 4R. The pressure of the compressed air is sufficient to overcome the holding effect of the vacuum in the flutes which is still being communicated thereto through the line 15 and fixed manifold 16. The defective cigarettes will thus be dropped or blown from the drum 1.

The good cigarettes are passed by the reject station E without the imposition of the compressed air in their flutes and continue on their path of travel to the point of tangency C with the takeoff drum 6. As previously described in connection with the pickup of cigarettes from the feed drum 2, the transfer to the takeoff drum 6 occurs as follows.

Referring to FIG. 2, the fluted members 6L and 6R in the takeoff drum 6 engage the exposed half of the cigarette opposite the point of the test drum fluted members 4L and 4R. A source of vacuum (not shown) has just been communicated to the takeoff drum flutes prior to their reaching this point C in its rotation. The interiors of the test drum flutes 124 and 125 are then communicated through lines 14 and 50 and the fixed manifold 16 with atmospheric pressure or a source of compressed air. The air releases the holding effect of the test drum flutes on the cigarette, and the vacuum operating in the takeoff drum fluted members 6L and 6R secures the cigarette therein for further transport on its surface.

If desired, a loose end inspection test may be performed at a station F shortly beyond this takeoff station C, and the defective cigarettes rejected at H prior to being passed for further processing along the manufacturing line. As previously mentioned, suitable apparatus for performing this test is disclosed in the copending application of McArthur, U.S. Pat. application Ser. No. 682,340.

SINGLE CIGARETTE TESTING

While the improved test apparatus of the present invention may be used for testing cigarettes in dual unit form as shown in the drawings in connection with the foregoing description, it is of particular value when used in the inspection of single cigarettes. As previously noted, when cigarettes are tested in dual unit form, a dual unit is rejected if only one-half of it is faulty, and thus, many good cigarettes are rejected along with their faulty mates. This waste of good cigarettes is economically undesirable. It therefore is desirable to inspect cigarettes singly and particularly without an attendant decrease in their rate of manufacture. The present invention embodies improved inspection systems which inspect the same number of single unit tipped cigarettes as the machinery used for testing the cigarettes in dual unit form and in the same amount of time.

Figure 6

A first embodiment of a system which accomplishes the aforementioned desirable result is shown in FIG. 6. In this embodiment, two testing drums are used in cooperation with suitable transfer drums, each of which feeds alternate cigarettes from the incoming line for testing. By the use of two inspection drums operating in parallel, the same number of single cigarettes can be tested as on a single drum testing cigarettes in dual unit form and in the same amount of time.

More particularly, FIG. 6 shows a dual inspection drum arrangement for performing the pulling and leak tests wherein the single cigarettes are fed along a linear conveyor 51. As the cigarettes pass along the conveyor 51 from the right-hand side, alternate ones are picked off by a small fluted transfer drum 52 and passed to the inspection drum 1a whose fluted members 4 are all equipped with the previously described test means. The respective fluted members cooperate with gripper drum 5 and have vacuum means and transfer the cigarettes as also previously described.

The cigarettes on drum 1a are passed through the pulling and leak tests at B and D and the defective ones rejected at E before a second small transfer drum 53 picks the remaining cigarettes off and passes them back to the conveyor 51 into the alternate holders which have been vacated by cigarettes selected by the first transfer drum 52.

The line of cigarettes is then passed along the conveyor 51 to a third transfer drum 54 which picks up the alternate cigarettes which have not been tested on the first inspection drum 1a. This third transfer drum 53 passes these cigarettes to a second inspection drum 1b which is identical to the first drum 1a. The same testing and rejection is performed on the second inspection drum 1b and a fourth transfer drum 55 places the acceptable cigarettes back on the conveyor 51 in an alternating manner as was performed by the second transfer drum 53. The conveyor 51 may then pass the line of good cigarettes for loose end inspection at F and further processing.

Figure 7

Another alternate embodiment using a dual inspection drum arrangement is shown in FIG. 7. The cigarettes to be tested are fed in at the top of the rotating drum system and are picked off the conveying means 56 in sequence by a first transfer drum 57. The drum 57 acts in cooperation with a second transfer drum 58 which removes every other cigarette from the first drum 57 in the manner previously described and passes these cigarettes to the right-hand inspection drum 1a. The cigarettes remaining on the first transfer drum 57 are passed to the left-hand inspection drum 1b. All of the fluted members 4 on these two inspection drums 1a and 1b are provided with testing means. The inspection drums 1a and 1b pass the cigarettes in the flutes through respective pulling and leak testing stations at B and D, rejecting the cigarettes found to be defective at E and then passing the good cigarettes to respective takeoff stations C. A third transfer drum 59 identical to the first transfer drum 57 picks up the cigarettes in alternate flutes on its surface from the left-hand inspection drum 1b. A fourth transfer drum 60 which is identical to the second transfer drum 58 picks off the cigarettes in each of its flutes from the right-hand transfer drum 1a and passes them to the alternate empty flutes on the third transfer drum 59. The third transfer drum 59 then passes them to a suitable conveying means 61 for loose-end inspection at F and further processing.

ALTERNATE TEST FLUTE DRUM

Figure 8

A single drum of the improved type of the present invention may be used in this operation by slightly modifying the cigarette holding flute arrangement as shown diagrammatically in FIG. 8.

This alternate embodiment uses an inspection drum 1c such as that shown in FIG. 1 but wherein alternate fluted members 4 and provided with testing means. The other fluted members 4n are without testing means.

The cigarettes to be tested are fed into each flute by a suitable means such as feed drum 62 and are passed along to a pull test station B. Here a gripper drum 5 cooperates with the test members 4 to perform the pull test. The cigarettes held in the test members 4 are then passed to the leak inspection station D. The defective cigarettes are rejected at E and the good cigarettes and untested cigarettes are passed further along the path of rotation. A set of three transfer drums 63, 64 and 65 is provided along this rotational path beyond the first set of testing stations B and D and acts to reverse the alternate positions of the cigarettes contained on the inspection drum 1c. This is accomplished by picking off all of the cigarettes with transfer drum 63 which rotates in a clockwise direction, passing them to the counterclockwise rotating drum 64 which in turn passes them to a third, clockwise rotating drum 65. Drum 65 returns the cigarettes in sequence back to the inspection drum 1c. The fluting in the three transfer drums is arranged so that as the cigarettes are returned in sequence to the inspection drum 1c, the untested cigarettes will be inserted in test members 4 while those which already have been tested will be placed in the ordinary fluted members 4n.

This is accomplished by providing for an odd number of flutes in the transfer path on drums 63, 64 and 65 between the pickoff point 160 and return point 161 while an even number of flutes are provided on the test drum 1c between these points. Alternate cigarettes have been darkened on this FIG. to better illustrate this arrangement and it will be seen that the converse arrangement of an even number of flutes in the transfer path with an odd number of flutes on the test drum between the points 160 and 161 will also accomplish the desired result.

A second set of test stations B' and D' then operates on the testing members 4 and the good cigarettes, all of which have now been tested, are passed by the transfer drum 66 to another conveyor 67 for loose end inspection at F and further processing.

Figure 9:
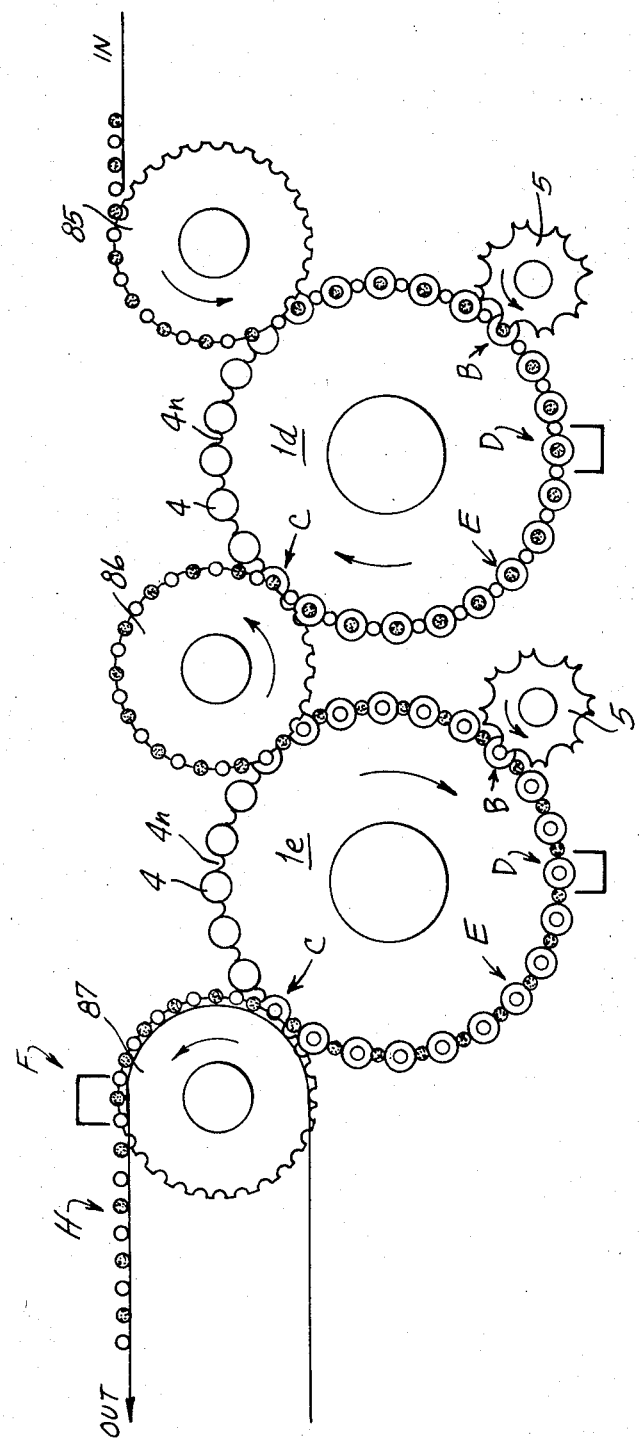
FIG. 9 is a diagrammatic view of still another alternate high speed testing arrangement.

A modified form of this system using two drums of the type shown in FIG. 8 is shown in FIG. 9.

The feed drum 85 feeds cigarettes into each fluted member 4 and 4n in sequence on the drum 1d. The pull and leak tests are performed on the cigarettes in the test fluted members 4 at B and D and the defective cigarettes are rejected at E before the good cigarettes along with the untested cigarettes are passed along the path of rotation to the transfer drum 86. The transfer drum 86 takes off both the good tested cigarettes (darkened circles) and the untested cigarettes in sequence and passes them to the test drum 1c. Again the flutes on the transfer path are of such a number that at the drum 1e the untested cigarettes are transferred to the test members 4 and the good cigarettes are placed in the ordinary fluted members 4n. The untested cigarettes are then passed through the various inspection stations B and D and the defective ones among them rejected before the good cigarettes arrive at takeoff drum 87. Drum 87 takes the cigarettes from test drum 1e and passes them along for loose end inspection at F and further processing.

TWIN INSPECTION DRUM

Figures 10 and 10a

A further modification of the improved test drum of the present invention will permit a single test drum to be used to singly test a given number of tipped cigarettes in the same amount of time as previously taken to test the same number of cigarettes in groups. This modification embodies a twin inspection system wherein the leak test is performed on alternate cigarettes on the same drum. Such a drum 1f is shown diagrammatically in an inspection system in FIG. 10. The twin inspection modification is shown in greater detail in FIG. 10a. As previously discussed with regard to the initial embodiment of the present invention shown in detail in FIGS. 2 to 5, compressed air or vacuum for performing the leak tests is communicated to the cigarette end through a port 35 in the annular outer flange 24 on the drum 1. When the drum 1 in its rotation reaches the point of the leak test station D, a fixed shoe 49 riding on the rotating flange 24 comes in communication with the port 35. A source of compressed air or vacuum is connected through line 90 to the shoe 49 and blows or draws air through the cigarette holding device 29 and through the cigarettes.

It will be seen that in order to test a given number of single cigarettes on a single drum in the same amount of time that a similar single drum will test the same number of cigarettes as dual units, the former drum must be rotated at twice the speed of the latter drum. However, an adequate amount of time must be taken to satisfactorily perform the leak tests. The manner in which the improved drum may be modified to accomplish this inspection over an adequate period of time and in sequence on each cigarette will now be described with reference to FIGS. 10 and 10a.

Alternate cigarettes in the series of fluted members 4f on the drum 1f are placed in communication with ports 35a and 35b which are located alternately on the opposite sides of the surface of the annular flange 24f as shown in FIG. 10a. The ports 35a and 35b cooperate with similarly arranged ports 36a and 36b on flange 37f in coupling the ends of the cigarettes S. Two air pressure shoes 49a and 49b, fed through lines 90a and 90b, are mounted for sliding on the surface of flange 14f also on the opposite sides thereof over the respective rows of ports 35a and 35b. A manifold 130f rides over the ports 36a and 36b on the other flange 37f. Manifold 130f has pressure lines 91a and 91b connected to it which, along with manifold 130f, cooperate with the shoes 49a and 49b and their respective pressure lines 90a and 90b to couple the ends of the cigarette for the leak testing operation. Manifold 130f also has lines 92a and 92b connecting it to the pressure source 131f for the reject operation.

The shoes 49a and 49b may be made to extend circumferentially on the flange 24f over a distance equivalent to the spacing or pitch of two cigarettes so that the test pressure may be communicated to each cigarette over twice the distance that would be permitted by prior art devices which tested the dual units over a distance of a single pitch. It will thus be seen that by circumferentially staggering and spacing the ports 35a and 35b communicating with alternate cigarettes that sufficient test pressure for an adequate time may be communicated to the individual cigarettes during the leak tests even though the speed of the drum has been doubled. Of course, if desired, this drum may be readily adapted to test dual unit cigarettes and thus inspect twice the number of cigarettes in the same amount of time as the prior art apparatus.

A particular system utilizing such an improved drum is shown in FIG. 10. More particularly, the incoming cigarettes from the feeding apparatus are picked up by a feed drum 68 located at the upper right in FIG. 10. This drum 68 which operates at the speed of the feeding apparatus cooperates with an adjacent feeding drum 69 which is rotated at twice the feed speed. This second high speed drum 69 acts to space the individual cigarettes for pickup on the inspection drum 1f. Each of the fluted members 4f on the inspection drum 1f is adapted to perform the pulling and leak tests on the cigarettes.

After being fed to the inspection drum 1f, the cigarettes are passed to the pull test station B where a gripper drum 5 is brought into contact with each cigarette to test it in tension in the manner already described. The fluted members 4f on the inspection drum 1f are suitably spaced to permit this test at high speed.

After the pulling test, the cigarettes are passed to the leak inspection station DT where they are operated on by the twin inspection system. The ends of every other cigarette are coupled through the lines 90a and 91a and test pressure is applied thereto, while the ends of the alternate cigarettes are coupled through the lines 90b and 91b for testing in a similar manner. Defective cigarettes will actuate valve means as described in connection with the apparatus in FIG. 4.

All the cigarettes are then passed to the rejection station E. Rejection is accomplished in the manner as described in connection with FIG. 3 by compressed air from a source 131f which is supplied to alternate flute members by the lines 92a and 92b (FIG. 10a).

After rejection of the defective cigarettes at station E, the remaining good cigarettes are passed to the takeoff station C. At the takeoff station C, two adjacent drums 70 and 71 are provided which are similar to the cooperating drums 68 and 69 for feeding the cigarettes to the inspection drum 1f but which are reversed in position. The drum 70 adjacent the inspection drum 1f picks the cigarettes from the test members 4 and rotates at twice the speed of the next adjacent drum 71. This latter drum 71 is provided with twice as many flutes as the high speed drum 70 so that the spacing between the cigarettes being fed to it from the high speed drum 70 will be half that of the spacing on the high speed drum 70. The cigarettes in this arrangement which is similar to that at which they were fed to the inspection mechanism are passed along for further processing. In this embodiment the loose end inspection is carried out at F at the high speed drum 70 and loose end rejection occurs at H where the cigarettes are fed to the lower speed drum 71.

Figure 11

An alternate embodiment for apparatus at the inspection station using a twin inspection type of drum is shown in FIG. 11. Here as the cigarettes are being fed along a linear conveyor 72, they are each picked up in sequence by a high speed drum 73 having relatively large spacing between its flutes. This high speed drum 73 cooperates with a second drum 74 which feeds the cigarettes to the testing members 4f on the twin inspection drum 1f. The cigarettes on the twin inspection drum are passed through the same testing operations as were carried out in the embodiment shown in FIG. 10 at stations B and DT, and the good cigarettes are picked off after passing the rejection station E by another drum 75 which is similar to the second feed drum 74. The drum 75 returns the cigarettes to the flutes on the high speed drum 73 which then returns them in sequence to the linear conveyor 72. Loose end inspection is carried out at a point F just beyond where the cigarettes are returned to the linear conveyor 72 and the cigarettes are then passed on for further processing.

Figure 12

Figure 12:
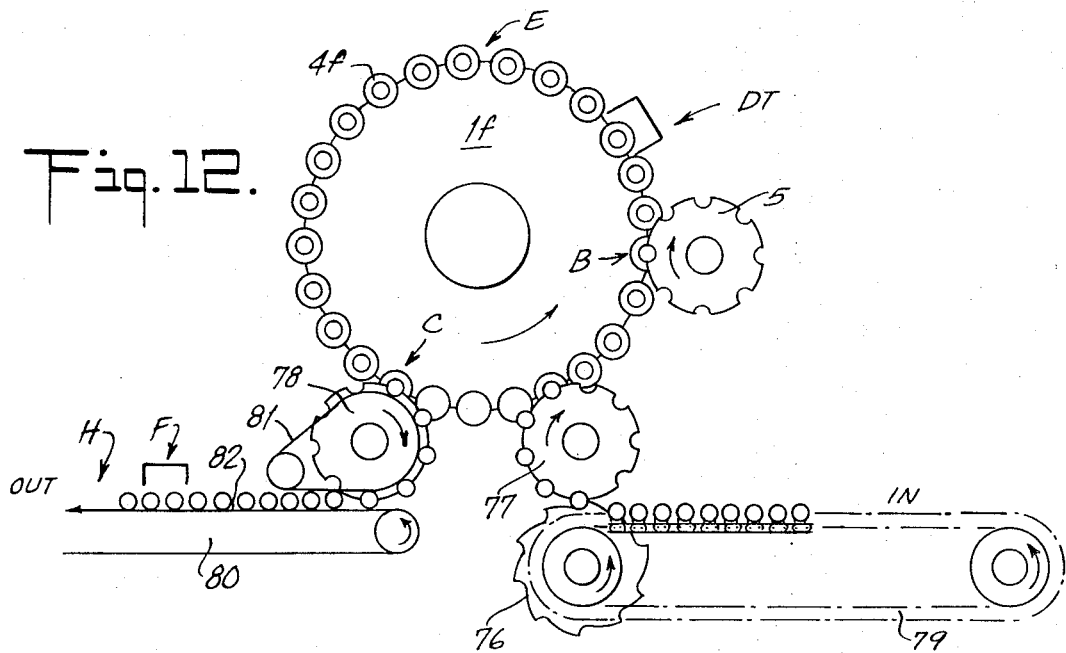
FIG. 12 is a diagrammatic view showing another modified test drum of the type shown in FIG. 10, in cooperation with a system of transfer drums, in an alternate arrangement.

In the embodiment shown in Fig. 12 a twin inspection drum 1f of the type shown in FIG. 10 is again used. Here two drums 76 and 77 are used for transferring the cigarettes to and from the twin inspection drum 1f. The cigarettes are picked off the feed conveyor 79 by a high speed drum 76 and passed to an intermediate feed drum 77 during which operation they are properly spaced for feeding to the twin inspection drum 1f. After passing through the various inspecting and rejecting operations at stations B, DT and E in the members 4f, they are returned to a drum 78 which is similar to the intermediate feed drum 77. The spacing between cigarettes on delivery to the takeout conveyor 80 is reduced by rolling the cigarettes between a belt 81 moving with drum 78 and the slower moving belt 82 of the conveyor 80 as shown. Loose end inspection may be performed at the point F.

Figure 13

Figure 13:
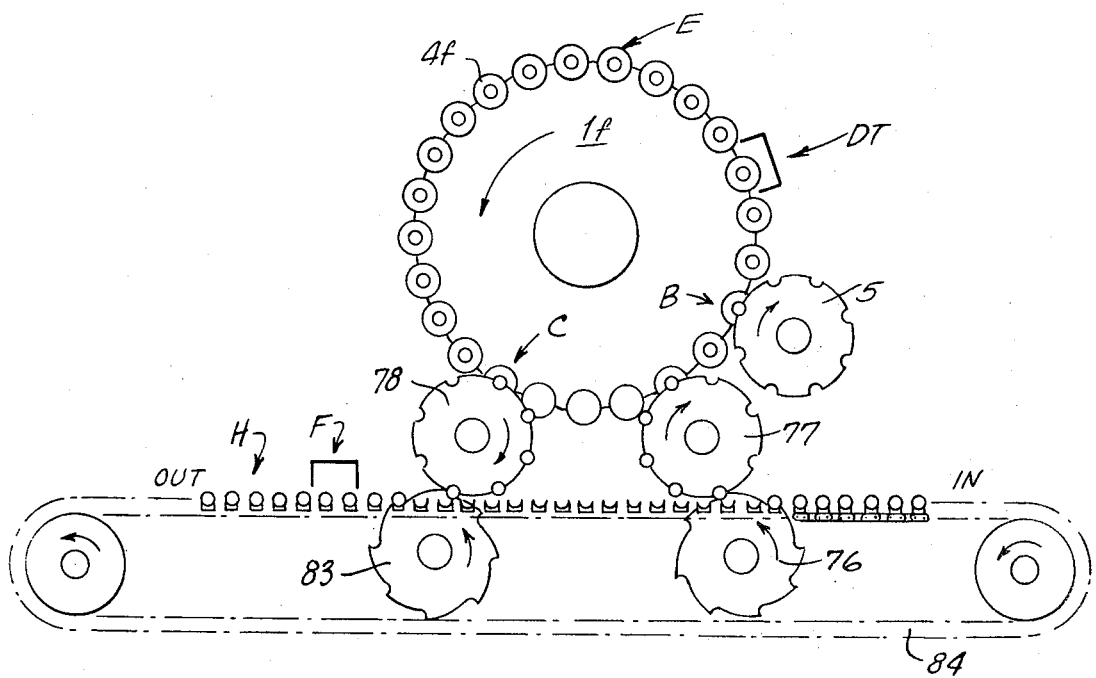
FIG. 13 is a diagrammatic view in elevation, showing still another modified test drum of the type shown in FIG. 10, in cooperation with a system of transfer drums, in an alternate arrangement.

The alternate embodiment shown in Fig. 13, which also is used in connection with a twin inspection drum 1f, duplicates the feed drum arrangement of the embodiment in FIG. 12 and utilizes a similar arrangement as in feeding including a reversely operating drum 83 for taking off the cigarettes and returning them to their proper spacing on the feed conveyor 84. Loose end inspection is performed further along the line at F and the cigarettes are then passed for further processing.

Figure 14

FIG. 14 shows a further improved system for processing single filter cigarettes manufactured as double units wherein the double units are cut into two rows of single cigarettes which are subsequently inspected on two, twin inspection drums and fed in alinement to a single cigarette conveyor line.

More particularly, the double unit cigarettes are supplied from a source 200 to a feed drum 100 on which they are cut in two by a knife means 101. The feed drum 100 has two associated pickoff drums 102 and 103. The lower one 102 picks off the nearest or front row of single cigarettes and feeds it to a twin inspection drum 104. The other drum 103 subsequently picks off the rear row of single cigarettes and feeds it to a twin inspection drum 105. After the cigarettes have been pull and leak tested on inspection drum 104 at B and DT, they are passed to alternate flutes in the takeoff drum 106. The cigarettes tested on inspection drum 105 are fed to each of the flutes in the takeoff drum 107 which passes them to a turnover drum 108.

The turnover drum 108 is of the type shown in the copending patent application of John Raymond Everhart, U.S. Pat. application Ser. No. 708,475, filed Feb. 20, 1968, now U.S. Pat. No. 3,485,337 entitled "High Speed Cigarette Turn Around and Conveyor Drum", and assigned to the assignee of the present application. The drum 108 will take the cigarettes fed to it and rotate them end-to-end reversing the positions of the filter tip and tobacco ends in the flutes.

It will be seen that the row of cigarettes tested on drum 105 has the filter tip toward the front or nearest the plane of the paper. These cigarettes are then reversed on drum 108 and fed to the alternate empty flutes on the transfer drum 106 so that the row of cigarettes on the transfer drum will have the filter tips and tobacco ends alined as a result of the turnover operation. The properly alined cigarettes are then picked off takeoff drum 106 and fed to a conveyor 110 by means of the drum 109 on which the loose end inspection may be performed at F. Suitable means (not shown) may be provided at H near the beginning of the conveyor 110 for rejecting the cigarettes failing the loose end test and the remaining good cigarettes are passed for further processing.

It will thus be seen that an improved apparatus and method is provided for inspecting cigarettes and more particularly, for inspecting single tipped cigarettes for faulty joints and leaks while maintaining high speed production. A preferred embodiment and various modifications of an improved inspection drum have been set forth in detail and in combination with other apparatus in improved inspecting systems which provide for a high quality end product as a result of more efficient testing while maintaining an economical rate of manufacture.

We claim:

1. Apparatus for testing filter cigarettes in tension to check the integrity of the joint between the filter and tobacco portion of the cigarette comprising:
  a. a testing station;
  b. means for conveying filter cigarettes successively through the station;
  c. holding means on said conveying means for retaining the cigarettes thereon;
  d. means for gripping the cigarettes on opposite sides of their filter tip-to-tobacco rod joint;
  e. means for applying a predetermined force to at least a portion of the gripping means said force acting longitudinally of the cigarette and being effective to disrupt the joint if its tensile strength is below a valve corresponding to said force;
  wherein the improvement comprises:
  f. said holding means including two portions spaced longitudinally of the cigarette on opposite sides of the joint with at least one of said portions being movable lengthwise of the cigarette;
  g. said gripping means including two portions spaced longitudinally of the cigarette on opposite sides of the joint and being located at the testing station and acting on the opposite sides of the cigarettes from said holding means with at least one of said portions of said gripping means being movable lengthwise of the cigarette in cooperation with the movable portion of said holding means; and
  h. said force applying means comprising means for simultaneously applying forces to the movable portions of the holding means and the gripping means.

2. Apparatus as claimed in claim 1 wherein said holding means and said gripping means apply diametrically opposed forces in gripping said cigarette.

3. Apparatus as claimed in claim 1 wherein the movable portions of said holding means and said gripping means comprise a set of fluted members which cooperate to substantially encircle said cigarette.

4. Apparatus as claimed in claim 3 wherein the set of fluted members encircle the filter portion of said cigarette.

5. Apparatus as claimed in claim 1 comprising means on said conveying means for leak testing said cigarettes.

6. Apparatus as claimed in claim 5 wherein said leak testing means tests a cigarette over a distance substantially equal to twice the distance between the axes of the cigarettes as held on the conveying means.

7. Apparatus as claimed in claim 1 comprising means on said conveying means for rejecting cigarettes found to be defective by ejection.

8. Apparatus as claimed in claim 1 wherein said conveying means is mounted for rotation.

9. Apparatus as claimed in claim 8 comprising gripping means mounted for rotation in the opposite sense from that of said conveying means.

10. Apparatus as claimed in claim 1 wherein said conveying means and said gripping means comprise counterrotating drums.

11. Apparatus for inspecting filter cigarettes for parted joints and leaks comprising:
  a. means for feeding the cigarettes in a line to a plurality of test stations;

b. means at a first station for applying a pull test to at least alternate cigarettes in the line;

c. means at a second station for applying a leak test to the cigarettes pull tested at said first station;

d. means for transferring said cigarettes from said feeding means through said test stations; and e. members on said transfer means for holding the cigarettes individually thereon;

wherein the improvement comprises:

f. gripping means located at said pull test station separately of said transfer means and acting opposite and in cooperation with said holding members in performing the pull test, which gripping means is adapted to cooperate with at least alternate ones of the cigarette holding members.

12. Apparatus as claimed in claim 11 wherein said transfer means is mounted for rotation.

13. Apparatus as claimed in claim 12 wherein said feeding means comprises means rotating counter to said transfer means.

14. Apparatus as claimed in claim 11 wherein said gripping means is rotatably mounted.

15. Apparatus as claimed in claim 11 wherein the transfer means comprises two rotating conveyors.

16. Apparatus as claimed in claim 15 wherein said feeding means comprises a first rotating conveyor for feeding one of said transfer conveyors and a second counterrotating conveyor for picking off alternate cigarettes from said first feed conveyor and feeding them to the other transfer conveyor.

17. Apparatus as claimed in claim 11 wherein alternate holding members are adapted to cooperate with said testing means.

18. Apparatus as claimed in claim 17 comprising means adjacent said transfer means for transferring cigarettes after testing from the holding members cooperating with said testing means to the alternate holding means on said transfer means.

19. Apparatus as claimed in claim 17 wherein said transfer means comprises two similarly rotating conveyors and a counterrotating means adjacent said conveyors for transferring cigarettes which have been tested from one conveyor to alternate holding members on the other conveyor.

20. Apparatus as claimed in claim 11 wherein all the cigarettes are pull tested at said first station.

21. Apparatus as claimed in claim 11 wherein the holding members are spaced from each other and said leak testing means tests the cigarettes over a distance substantially equal to twice the spacing between the holding members.

22. Apparatus as claimed in claim 11 wherein said feeding means comprises two rotating conveyors, one of which rotates at twice the speed of the other for properly spacing the cigarettes to be fed to said transfer means.

23. Apparatus as claimed in claim 11 wherein said feeding means includes means for cutting double length cigarettes in two.

24. Apparatus as claimed in claim 23 comprising means for removing the cut cigarettes in two separate rows from said feeding means.

25. Apparatus as claimed in claim 24 comprising means for turning over one of said rows of cigarettes end to end.